United States Patent
Myokan et al.

[11] Patent Number: 6,144,522
[45] Date of Patent: Nov. 7, 2000

[54] DISK DRIVE HAVING BREATHING FILTER PROTECTING MECHANISM

[75] Inventors: Kenichi Myokan; Takeo Hayashi, both of Kawasaki, Japan

[73] Assignee: Fujitsu Limited, Kawasaki, Japan

[21] Appl. No.: 09/179,292

[22] Filed: Oct. 27, 1998

[30] Foreign Application Priority Data

Jun. 12, 1998 [JP] Japan .................................. 10-164590

[51] Int. Cl.[7] .................................................. G11B 33/14
[52] U.S. Cl. ........................................................ 360/97.02
[58] Field of Search .............................. 360/97.01–97.04

[56] References Cited

U.S. PATENT DOCUMENTS 4,888,656  12/1989  Bonn ..................................... 360/97.03

FOREIGN PATENT DOCUMENTS 0246756  11/1987  European Pat. Off. .
0295054  12/1988  European Pat. Off. .
07173490   7/1995  Japan .

*Primary Examiner*—Allen T. Cao
*Attorney, Agent, or Firm*—Greer, Burns & Crain, Ltd.

[57] ABSTRACT

A disk drive includes a disk rotatably mounted in a housing, the disk having a plurality of tracks, a head for reading/writing data on the disk, and an actuator for moving the head across the tracks of the disk. The disk drive further includes a breathing filter fixed to the inner surface of a cover of the housing so as to close a breathing hole formed through the cover, and a breathing filter protecting member fixed to the outer surface of the cover so as to close the breathing hole and allow ventilation.

18 Claims, 13 Drawing Sheets

DISK DRIVE HAVING BREATHING FILTER PROTECTING MECHANISM

BACKGROUND OF THE INVENTION

1. Field of the Invention

The present invention relates to a disk drive having a breathing filter protecting mechanism.

2. Description of the Related Art

In recent years, a magnetic disk drive as a kind of external storage for a computer has been increasingly reduced in size, particularly in thickness, and low power consumption has been required. On the other hand, increasing the recording density of a magnetic disk to increase the capacity has also been required, and the number of magnetic disks to be mounted in a magnetic disk drive is increasing.

In a magnetic disk drive for a computer, a contact start and stop (CSS) system is generally adopted as the relationship between a head and a magnetic disk. This system is such that while the disk is in rotation, the head is kept flying a slight distance away from the disk at a microscopic height owing to the balance between a flying force applied to the head by an air flow generated by high-speed rotation of the disk and an elastic force of a suspension pressing the head onto the disk. When the disk rotation is stopped, the head is moved to a contact zone formed on the disk and comes into contact with the disk at the contact zone. While the disk is at rest, the head and the disk are kept in contact with each other.

As mentioned above, the head is kept flying above the disk at a microscopic height during rotation of the disk. Accordingly, there is the possibility of a head crash or the like due to even a small amount of dust or the like amount. To cope with this problem, the magnetic disk and the magnetic head for reading/writing data on the magnetic disk are enclosed in a sealed chamber defined as a disk enclosure (housing). However, it is difficult to keep the sealed condition in the magnetic disk drive over a long term. Further, the flying height of the magnetic head may change with pressure changes in the sealed chamber due to temperature changes or the like.

To prevent this problem, a small breathing hole (ventilation hole) is formed through a cover forming a component of the housing of the magnetic disk drive, thereby making the inside pressure of the magnetic disk drive substantially equal to the outside atmospheric pressure. The small breathing hole is usually provided with a breathing filter to prevent the entry of dust present in the atmosphere into the magnetic disk drive while making the inside pressure of the magnetic disk drive substantially equal to the outside atmospheric pressure.

The breathing filter used in the conventional magnetic disk drive is formed of nonwoven fabric, or the like, and is designed only for the function of passing air to keep the inside pressure of the magnetic disk drive substantially equal to the outside atmospheric pressure and for the function of not passing dust present in the atmospheric air. Since the breathing filter is formed of nonwoven fabric or the like, there is a possibility that an insect, such as an ant may break the breathing filter and enter the magnetic disk drive, which would cause problems.

SUMMARY OF THE INVENTION

It is therefore an object of the present invention to provide a disk drive having a breathing filter protecting mechanism which can prevent the entry of insects, such as ants, through the breathing filter into the disk drive.

In accordance with an aspect of the present invention, there is provided a disk drive comprising a housing including a base and a cover fixed to said base, the cover having a breathing hole; a disk rotatably mounted in the housing, the disk having a plurality of tracks; a head for reading/writing data on the disk; an actuator for moving the head across the tracks of the disk; a breathing filter fixed to an inner surface of the cover so as to close the breathing hole; and a breathing filter protecting member fixed to an outer surface of the cover so as to close the breathing hole and to allow ventilation.

Preferably, the breathing filter protecting member is formed from a net or a plate having a plurality of holes. By applying an insect repellent to the net or the plate, entry of an insect can be more effectively prevented. In a modification, the breathing filter protecting member may be formed from a cap having a plurality of holes. By applying an insect repellent to the cap, or by mounting an insect repelling member on the cap, entry of an insect can be more effectively prevented.

In accordance with another aspect of the present invention, there is provided a disk drive comprising a housing including a base and a cover fixed to the base, the cover having a breathing hole; a disk rotatably mounted in the housing, the disk having a plurality of tracks; a head for reading/writing data on the disk; an actuator for moving the head across the tracks of the disk; a breathing filter unit including a breathing filter and a breathing filter protecting member mounted on the breathing filter, the breathing filter protecting member allowing ventilation; and means for fixing the breathing filter unit to an inner surface of the cover so that the breathing filter protecting member is in contact with the inner surface of the cover and the breathing filter unit closes said breathing hole.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
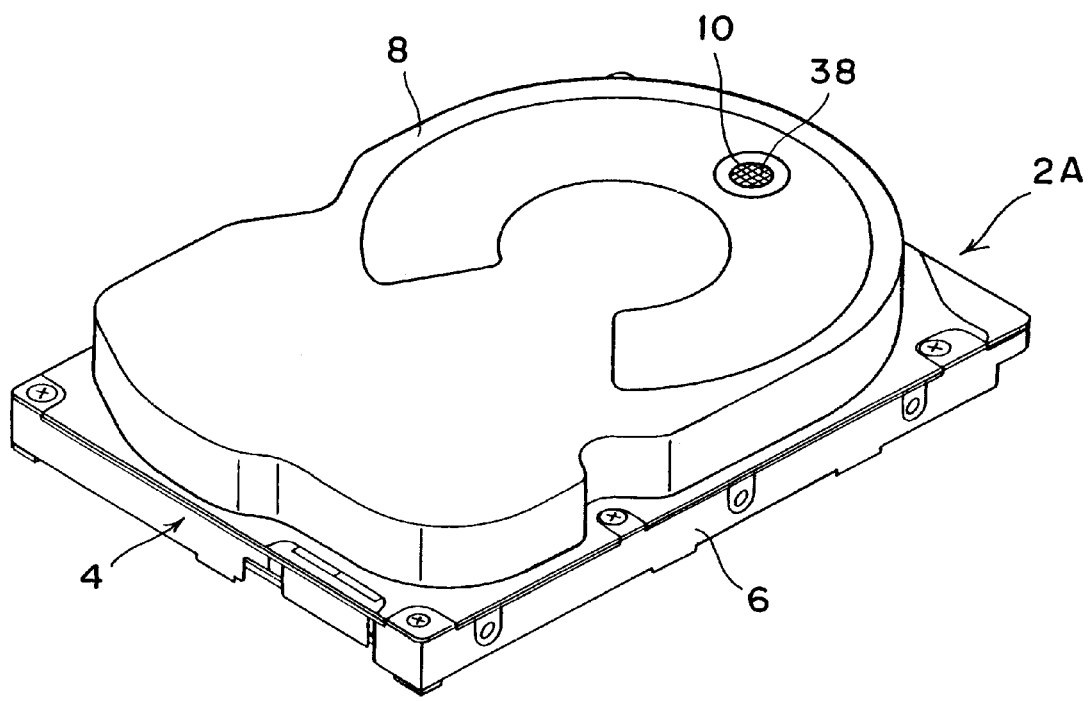
FIG. 1 is a perspective view of a magnetic disk drive according to a first preferred embodiment of the present invention.

Various preferred embodiments of the present invention will now be described with reference to the drawings. Throughout the drawings, substantially the same parts will be denoted by the same reference numerals. Referring to FIG. 1, there is shown a perspective view of a magnetic disk drive 2A according to a first preferred embodiment of the present invention. Reference numeral 4 denotes a housing of the magnetic disk drive 2A. The housing 4 includes a base 6 and a cover 8 fixed to the base 6. The cover 8 is formed with a circular breathing hole 10 having a diameter of about 2 mm. A circular net 38 for closing the breathing hole 10 is bonded to the cover 8.

Figure 2:
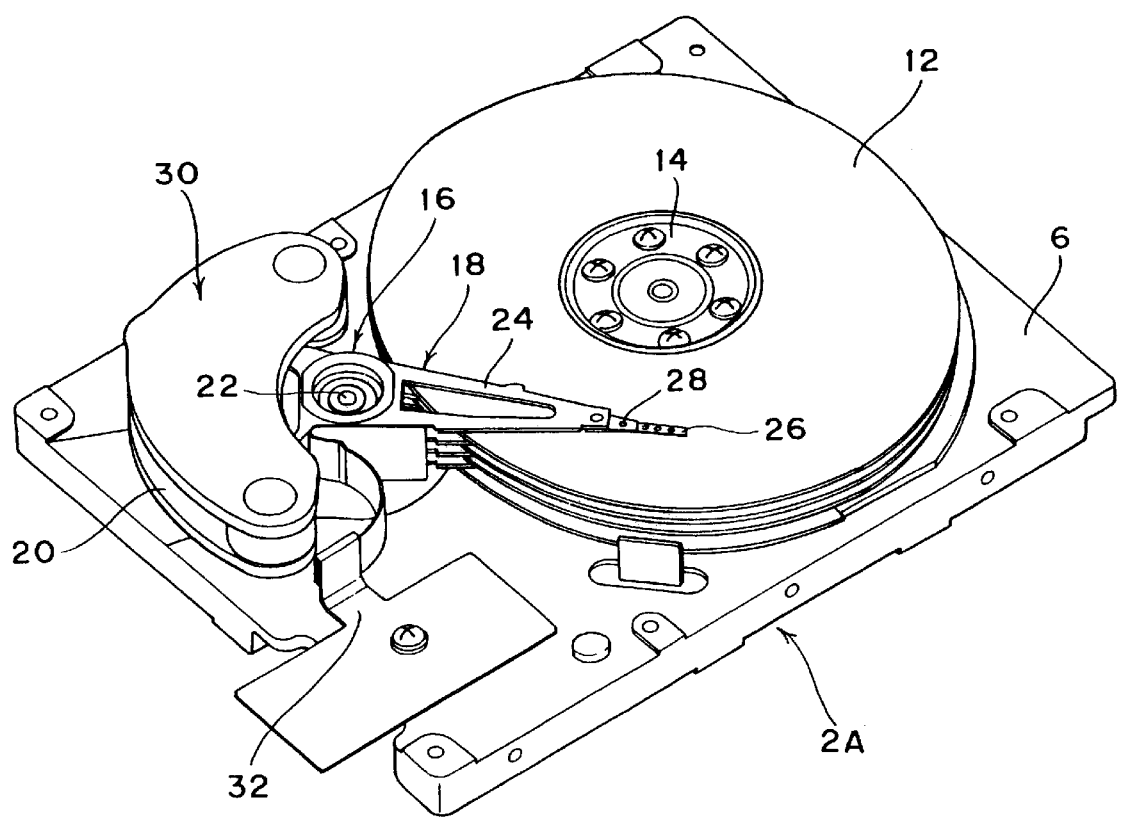
FIG. 2 is a perspective view of the magnetic disk drive with the cover removed.

FIG. 2 is a perspective view of the magnetic disk drive 2A with the cover 8 removed. A spindle hub (not shown), which is rotatably driven by an inner hub motor, is provided on the base 6. A plurality of magnetic disks 12 and spacers (not shown) are mounted on the spindle hub in such a manner as to be alternately stacked. That is, the plural magnetic disks 12 are fixedly mounted on the spindle hub by securing a disk clamp 14 to the spindle hub by screws, and are equally spaced a given distance apart from each other by the spacers.

Reference numeral 16 denotes a rotary actuator consisting of an actuator arm assembly 18 and a magnetic circuit 20. The actuator arm assembly 18 is mounted so as to be rotatable about a shaft 22 that is fixed to the base 6. The actuator arm assembly 18 is composed of actuator arms 24 extending in one direction, and suspensions 28 fixedly connected to the actuator arms 24. A magnetic head 26 is mounted on a front end portion of each suspension 28.

A coil (not shown) is supported on the opposite side of the actuator arms 24 with respect to the shaft 22. The magnetic circuit 20 and the coil, which is inserted into a gap of the magnetic circuit 20, constitute a voice coil motor (VCM) 30. Reference numeral 32 denotes a flexible printed circuit board (FPC) for supplying write signals to the magnetic heads 26 and for taking read signals from the magnetic heads 26. The flexible printed circuit board 32 is fixed at its one end to the side surfaces of the actuator arms 24.

Figure 3:
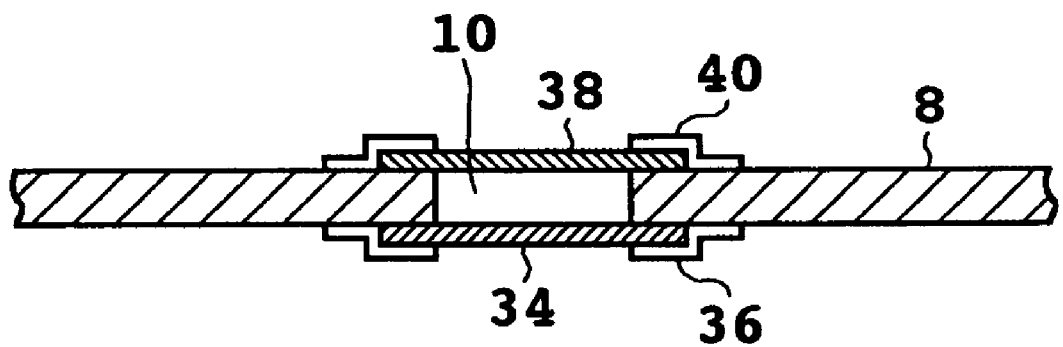
FIG. 3 is a sectional view of a breathing filter protecting structure in the first preferred embodiment.

Referring to FIG. 3, there is shown a sectional view of a breathing filter protecting structure in the first preferred embodiment. A circular breathing filter 34 is fixed to the cover 8 by an annular mounting seal 36 so as to close the breathing hole 10 from the inside of the cover 8. The breathing filter 34 is formed from nonwoven fabric, for example. The circular net 38 mentioned above is fixed to the cover 8 by an annular mounting seal 40 so as to close the breathing hole 10 from the outside of the cover 8 and to allow ventilation through breathing hole 10.

Figure 4A:
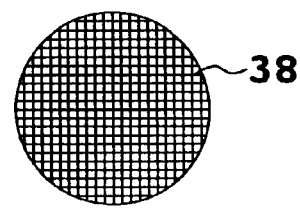
FIG. 4A is a plan view of a net.
Figure 4B:
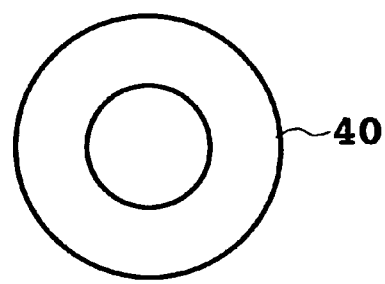
FIG. 4B is a plan view of a mounting seal.
Figure 4C:
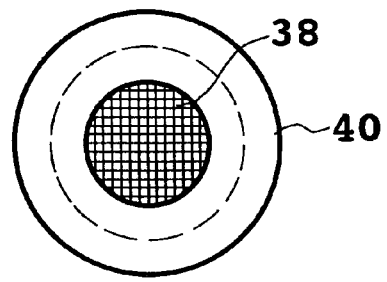
FIG. 4C is the plan view showing a condition where the net is mounted on the cover by the mounting seal.

That is, the net 38 shown in FIG. 4A is fixed to the outer surface of the cover 8 by the mounting seal 40 shown in FIG. 4B so as to close the breathing hole 10. FIG. 4C is a plan view showing the condition where the net 38 is fixed to the cover 8 by the mounting seal 40. The net 38 is formed of metal or synthetic resin, and has meshes inhibiting the pass of a small insect such as ants. The mounting seals 36 and 40 may be replaced by double-sided adhesive tapes for fixing the breathing filter 34 and the net 38 to the cover 8. The net 38 has a diameter of about 10 to 15 mm.

In the magnetic disk drive 2A according to this preferred embodiment, the breathing filter 34 is mounted on the inner surface of the cover 8 so as to close the breathing hole 10 on its inner side, and the net 38 is mounted on the outer surface of the cover 8 so as to close the breathing hole 10 on its outer side. The net 38 allows ventilation and inhibits the passage of small insects. Accordingly, it is possible to effectively prevent a small insect, such as an ant, from breaking the breathing filter 34. As a result, the breathing filter 34 can maintain its function of effectively preventing the entry of dust present in the atmospheric air into the magnetic disk drive 2A while intaking atmospheric air through the breathing hole 10.

Figure 5:
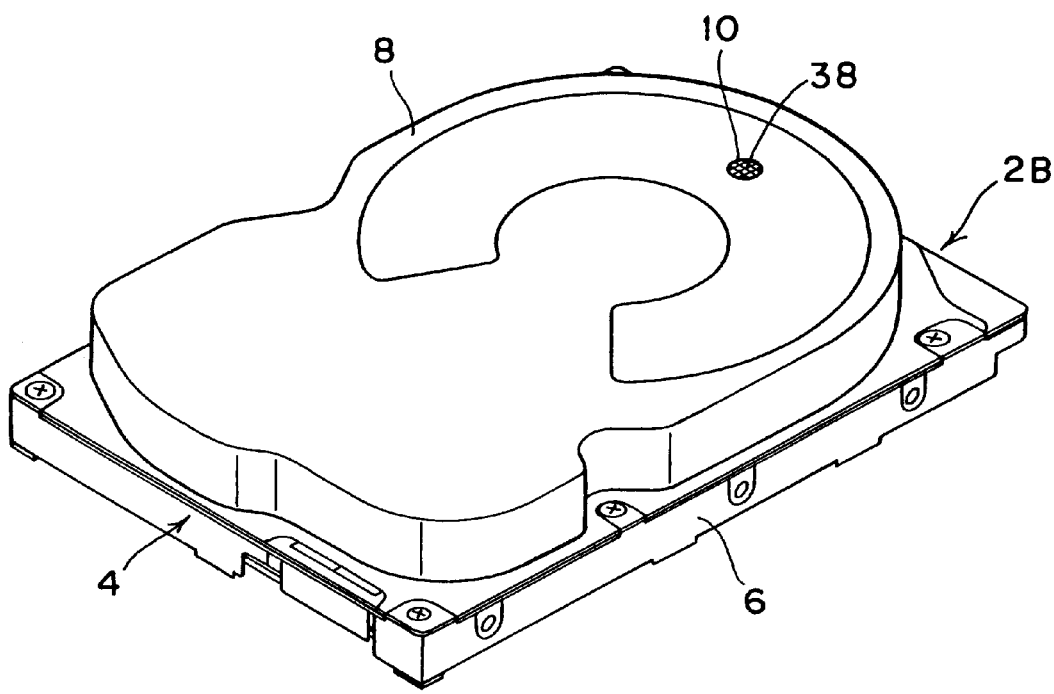
FIG. 5 is a perspective view of a magnetic disk drive according to a second preferred embodiment of the present invention.
Figure 6:
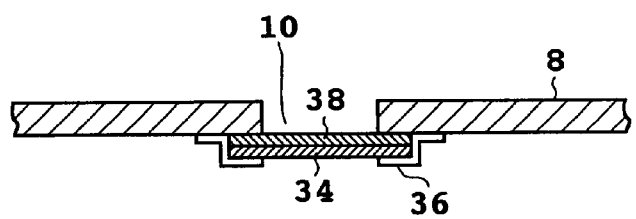
FIG. 6 is a sectional view of a breathing filter protecting structure in the second preferred embodiment.

Referring to FIG. 5, there is shown a perspective view of a magnetic disk drive 2B according to a second preferred embodiment of the present invention. The magnetic disk drive 2B according to this preferred embodiment has components similar to those of the magnetic disk drive 2A according to the first preferred embodiment shown in FIG. 2. FIG. 6 is a sectional view of a breathing filter protecting structure in the second preferred embodiment. In this preferred embodiment, the breathing filter 34 and the net 38 are stacked in such a manner that the net 38 is in contact with the inner surface of the cover 8, and both components are fixed together and to the cover 8 by the mounting seal 36 so as to close the breathing hole 10.

This preferred embodiment can exhibit an effect of preventing the entry of an insect in a similar manner as the first preferred embodiment. Furthermore, by applying an insect repellent, such as allethrin, to the net 38, an effect of repelling an insect can also be exhibited. This latter effect can be exhibited also in the first preferred embodiment as well.

Figure 7:
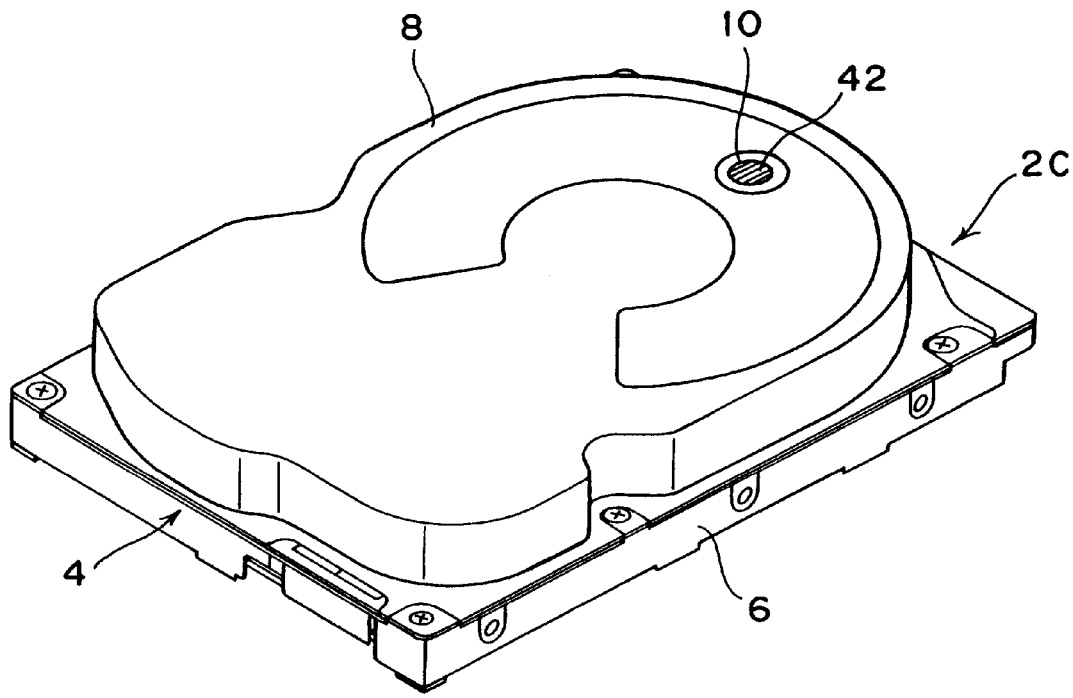
FIG. 7 is a perspective view of a magnetic disk drive according to a third preferred embodiment of the present invention.
Figure 8:
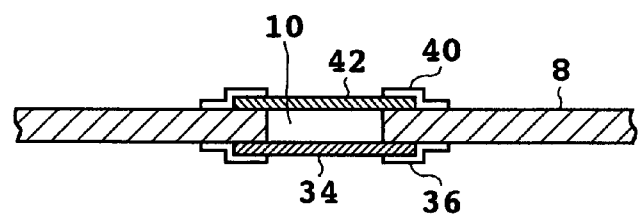
FIG. 8 is a sectional view of a breathing filter protecting structure in the third preferred embodiment.
Figure 9A:
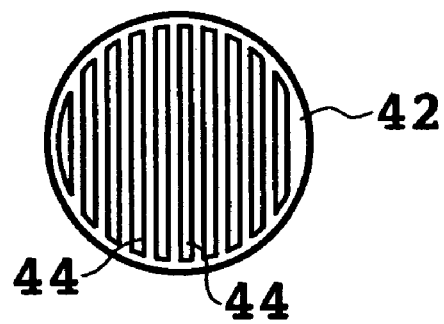
FIG. 9A is a plan view of a plate.

Referring to FIG. 7, there is shown a perspective view of a magnetic disk drive 2C according to a third preferred embodiment of the present invention. The magnetic disk drive 2C has components similar to those of the magnetic disk drive 2A according to the first preferred embodiment shown in FIG. 2. Referring to FIG. 8, there is shown a sectional view of a breathing filter protecting structure in the third preferred embodiment. In this preferred embodiment, the net 38 used in the first preferred embodiment shown in FIG. 3 is replaced by a circular plate 42 having a plurality of holes 44 shown in FIG. 9A as the breathing filter protecting member.

Figure 9B:
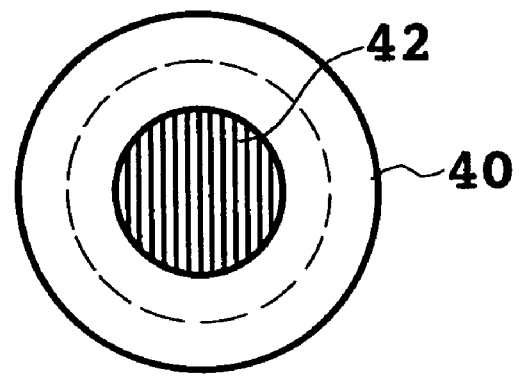
FIG. 9B is a plan view showing a condition where the plate is mounted on the cover by the mounting seal.

While the holes 44 are slits each having a width of about 0.1 mm in this preferred embodiment, the form of the holes 44 are not limited to such slits, but may be any form that can prevent the entry of a small insect. The plate 42 is formed of a metal or a synthetic resin. The plate 42 has a thickness of about 0.3 to 0.5 mm, and a diameter of about 10 to 15 mm. FIG. 9B is a plan view showing the condition where the plate 42 is attached to the cover 8 by the mounting seal 40. This preferred embodiment also has an insect entry preventing effect similar to that of the first preferred embodiment. Further, by applying an insect repellent to the plate 42, an insect repelling effect can also be exhibited.

Figure 10:
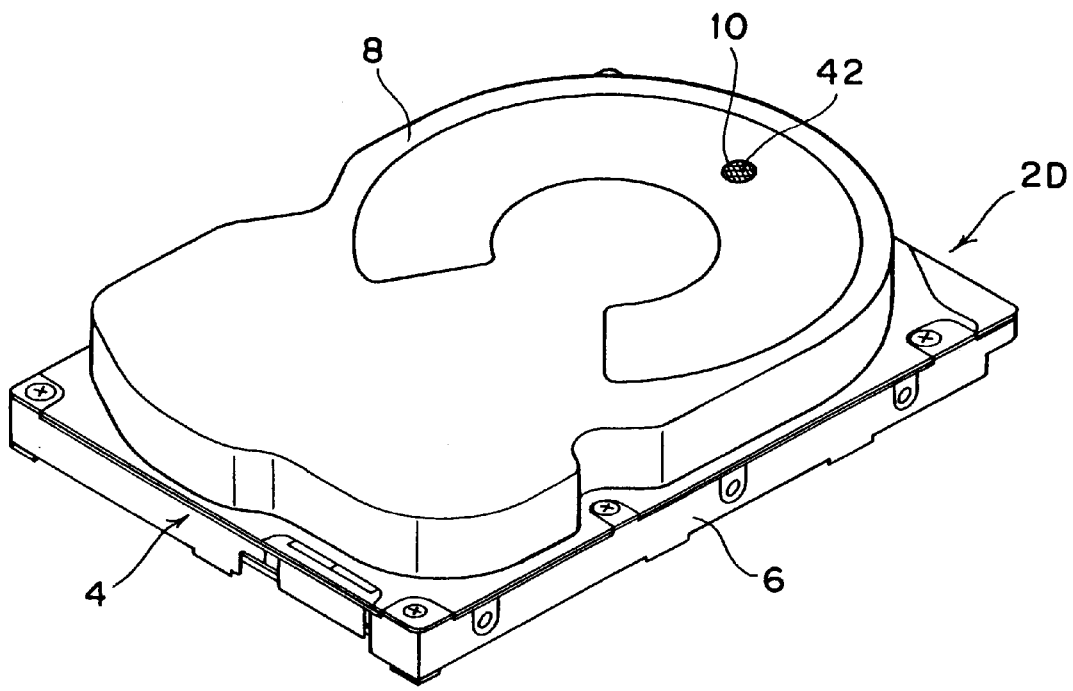
FIG. 10 is a perspective view of a magnetic disk drive according to a fourth preferred embodiment of the present invention.
Figure 11:
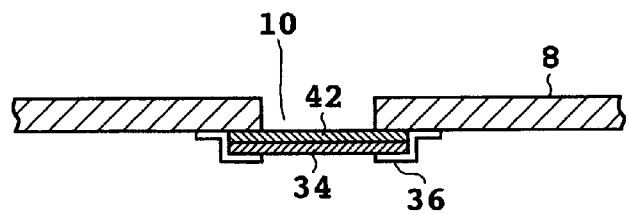
FIG. 11 is a sectional view of a breathing filter protecting structure in the fourth preferred embodiment.

Referring to FIG. 10, there is shown a perspective view of a magnetic disk drive 2D according to a fourth preferred embodiment of the present invention. The magnetic disk drive 2D has components similar to those of the magnetic disk drive 2A according to the first preferred embodiment shown in FIG. 2. Referring to FIG. 11, there is shown a sectional view of a breathing filter protecting structure in the fourth preferred embodiment. In this preferred embodiment, the net 38 used in the second preferred embodiment shown in FIG. 6 is replaced by the plate 42. This preferred embodiment also has an insect entry preventing effect that can prevent the entry of a small insect through the breathing hole 10 like the first and second preferred embodiments.

Figure 12:
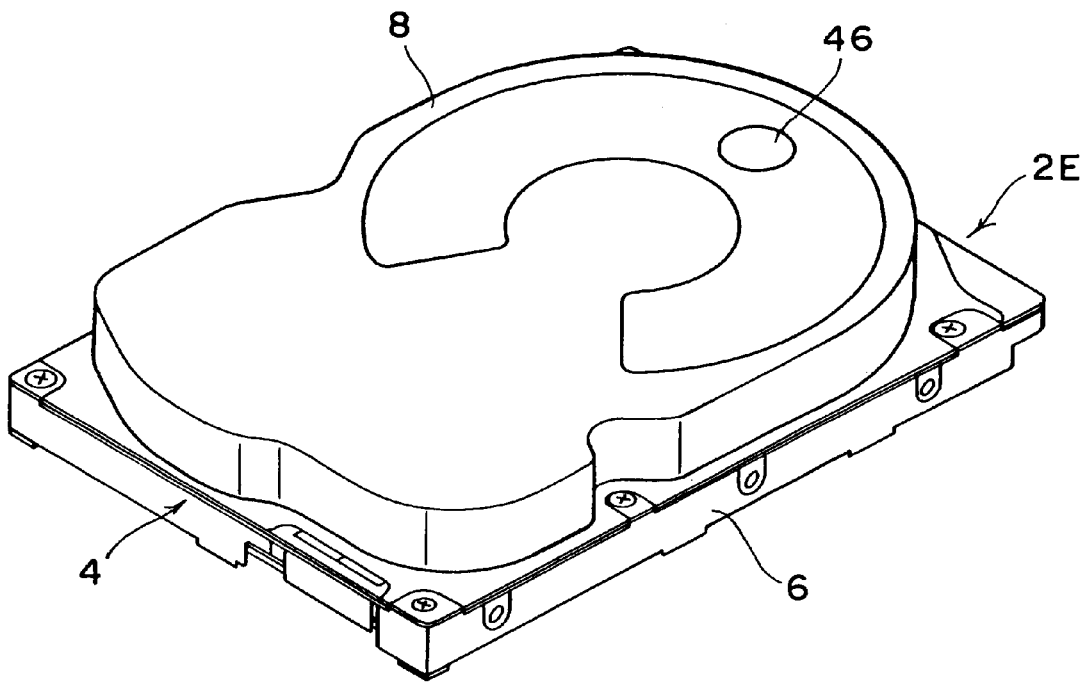
FIG. 12 is a perspective view of a magnetic disk drive according to a fifth preferred embodiment of the present invention.
Figure 13:
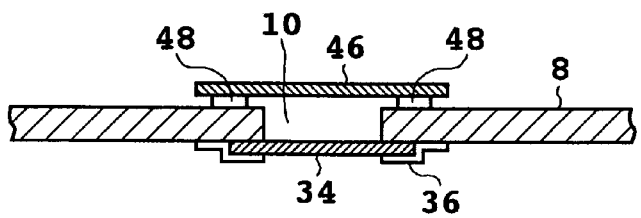
FIG. 13 is a sectional view of a breathing filter protecting structure in the fifth preferred embodiment.
Figure 14A:
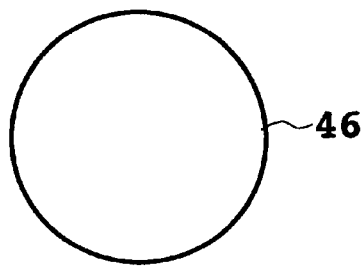
FIG. 14A is a plan view of a plate.
Figure 14B:
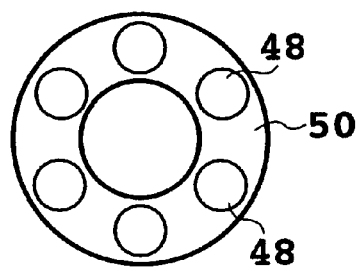
FIG. 14B is a plan view of a plurality of double-sided adhesive tapes attached to a separatable sheet.

Referring to FIG. 12, there is shown a perspective view of a magnetic disk drive 2E according to a fifth preferred embodiment of the present invention. The magnetic disk drive 2E has components similar to those of the magnetic disk drive 2A according to the first preferred embodiment shown in FIG. 2. Referring to FIG. 13, there is shown a sectional view of a breathing filter protecting structure in the fifth preferred embodiment. In this preferred embodiment, a circular solid plate 46 shown in FIG. 14A is fixed to the outer surface of the cover 8 through a plurality of small-diameter circular double-sided adhesive tapes 48, spaced a given distance, each having a given thickness. As shown in FIG. 14B, the double-sided adhesive tapes 48 are originally attached to an annular separatable sheet 50 on one side and protected by a protective sheet (not shown) on the other side.

In fixing the plate 46 through the double-sided adhesive tapes 48 to the cover 8, the protective sheet attached to the adhesive tapes 48 is first peeled off, and the adhesive tapes 48 with the separatable sheet 50 are next bonded to the plate 46. Thereafter, the separatable sheet 50 is peeled off, thus obtaining the plate 46 with the adhesive tapes 48. Then, the plate 46 is fixed through the adhesive tapes 48 to the outer surface of the cover 8 so as to close the breathing hole 10 on its outer side.

Figure 14C:
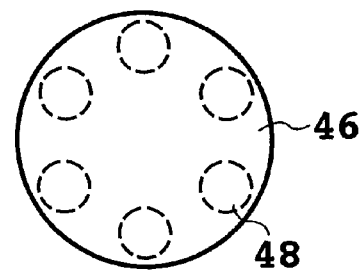
FIG. 14C is a plan view showing a condition where the plate is bonded through the double-sided adhesive tapes to the cover.

As shown in FIG. 13, there is defined a thin space between the cover 8 and the plate 46 corresponding to the thickness (0.1 to 0.15 mm) of each double-sided adhesive tape 48, thereby allowing communication of the atmospheric air and the inside air in the disk drive. This space is set small enough to prevent the entry of a small insect, such as an ant, into the breathing hole 10. FIG. 14C is a plan view showing the condition where the plate 46 is attached to the cover 8 by the adhesive tapes 48 so as to close the breathing hole 10.

Figure 15:
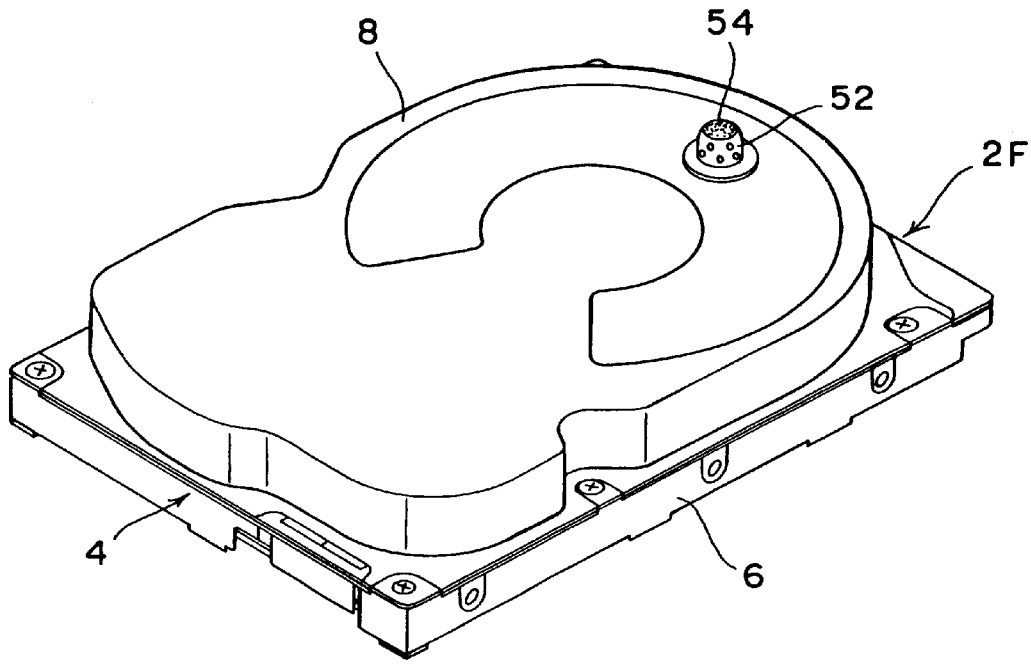
FIG. 15 is a perspective view of a magnetic disk drive according to a sixth preferred embodiment of the present invention.
Figure 16:
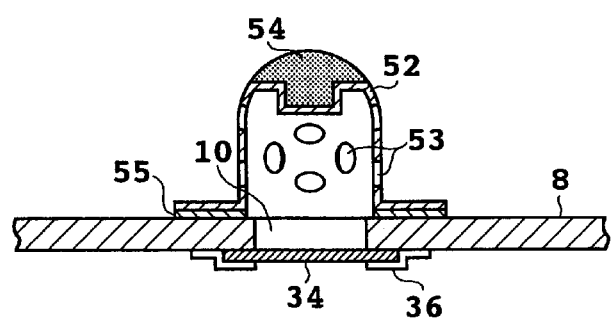
FIG. 16 is a sectional view of a breathing filter protecting structure in the sixth preferred embodiment.

Referring to FIG. 15, there is shown a perspective view of a magnetic disk drive 2F according to a sixth preferred embodiment of the present invention. The magnetic disk drive 2F has components similar to those of the magnetic disk drive 2A according to the first preferred embodiment shown in FIG. 2. Referring to FIG. 16, there is shown a sectional view of a breathing filter protecting structure in the sixth preferred embodiment. A dome-shaped cap 52 having a plurality of holes 53 is fixed through an annular double-sided adhesive tape 55 to the outer surface of the cover 8 so as to close the breathing hole 10 on its outer side.

The cap 52 is formed of synthetic resin, for example, and has a height of about 8 to 10 mm. An insect repelling member 54 is mounted on the top of the cap 52. Each hole 53 is set to be small (0.1 to 1 mm in diameter) enough to prevent the entry of a small insect into the breathing hole 10. Also according to this preferred embodiment employing the cap 52 mounted on the cover 8 so as to close the breathing hole 10, an insect entry preventing effect similar to that of the first preferred embodiment can be exhibited. Further, owing to the insect repelling member 54 mounted on the top of the cap 52, an insect repelling effect can also be exhibited.

Figure 17:
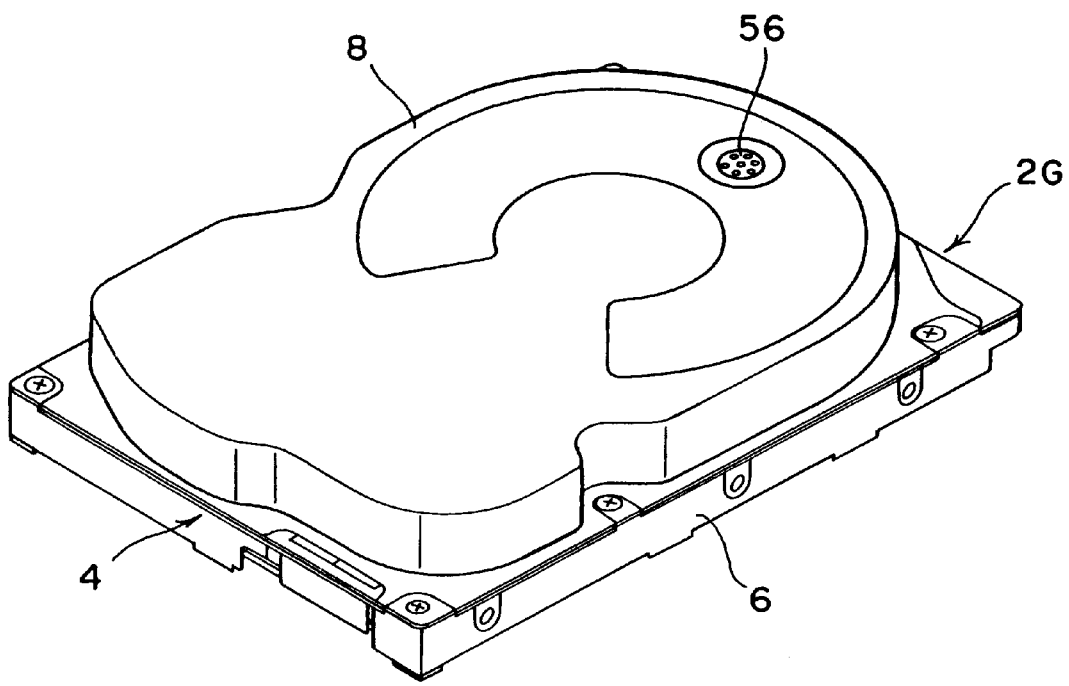
FIG. 17 is a perspective view of a magnetic disk drive according to a seventh preferred embodiment of the present invention.
Figure 18:
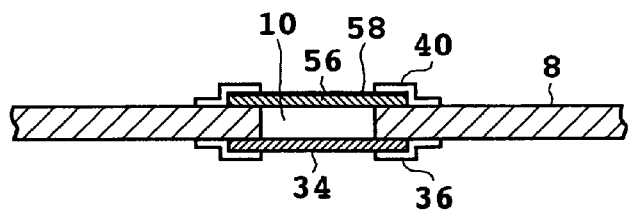
FIG. 18 is a sectional view of a breathing filter protecting structure in the seventh preferred embodiment.
Figure 19A:
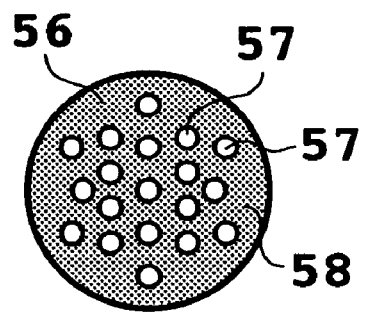
FIG. 19A is a plan view of a plate coated with an insect repellent.

Referring to FIG. 17, there is shown a perspective view of a magnetic disk drive 2G according to a seventh preferred embodiment of the present invention. The magnetic disk drive 2G has components similar to those of the magnetic disk drive 2A according to the first preferred embodiment shown in FIG. 2. Referring to FIG. 18, there is shown a sectional view of a breathing filter protecting structure in the seventh preferred embodiment. In this preferred embodiment, a circular plate 56 having a plurality of circular holes 57 as shown in FIG. 19A is fixed to the outer surface of the cover 8 by the mounting 40 so as to close the breathing hole 10 on its outer side. Each hole 57 has a diameter small enough to prevent the entry of a small insect into the breathing hole 10. Furthermore, the outer surface of the plate 56 is coated with an insect repellent 58 such as allethrin.

Figure 19B:
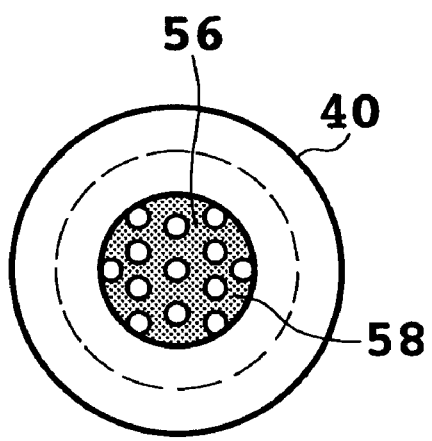
FIG. 19B is a plan view showing a condition where the plate is fixed to the cover by the mounting seal.

This preferred embodiment can also exhibit an insect entry preventing effect similar to that of the first preferred embodiment. Furthermore, owing to the insect repellent 58 applied to the outer surface of the plate 56, an insect repelling effect can also be exhibited. FIG. 19B is a plan view showing the condition where the plate 56 is fixed to the cover 8 by the mounting seal 40 so as to close the breathing hole 10. Although the plates and the net used in the above preferred embodiments are circular, they may also be elliptical or polygonal.

According to the present invention, the breathing filter protecting member is mounted on the cover so as to close the breathing hole, so that the entry of a small insect or the like through the breathing hole into the magnetic disk drive can be prevented, thereby preventing a break of the breathing filter due to the small insect. As a result, it is possible to exhibit the original function of the breathing filter, that is, the function of preventing the entry of dust into the magnetic disk drive.

What is claimed is:

1. A disk drive comprising:
   a housing including a base and a cover fixed to said base, said cover having a breathing hole;
   at least one disk rotatably mounted within said housing, said at least one disk having a plurality of tracks;
   a head for reading/writing data on said at least one disk;
   an actuator for moving said head across said tracks of said at least one disk;
   a breathing filter fixed to said cover so as to completely overlap said breathing hole; and a breathing filter protection member fixed to said cover so as to completely overlap said breathing hole while still allowing ventilation therethrough;

wherein said breathing filter protection member is configured and arranged with openings small enough to prevent insects from passing therethrough and further wherein said openings are in the range of approximately 0.1 mm and 1 mm.

2. The disk drive according to claim 1, wherein said breathing filter protecting member comprises a net, whereby said openings are defined by the mesh of said net.

3. The disk drive according to claim 1, wherein said breathing filter protecting member comprises a plate having a plurality of said openings therein.

4. The disk drive according to claim 3, wherein said plate is coated with an insect repellent.

5. The disk drive according to claim 1, wherein said breathing filter protecting member comprises a generally cylindrical cap having a plurality of said openings located in side surfaces thereof.

6. The disk drive according to claim 5, wherein said breathing filter protecting member further comprises an insect repelling member mounted on said cap.

7. The disk drive according to claim 1, wherein said openings of said breathing filter protection member have diameters of approximately 0.1 mm.

8. A disk drive comprising:

a housing including a base and a cover fixed to said base, said cover having a breathing hole;

at least one disk rotatably mounted within said housing, said at least one disk having a plurality of tracks;

a head for reading/writing data on said at least one disk;

an actuator for moving said head across said tracks of said at least one disk;

a breathing filter unit including a breathing filter and a breathing filter protecting member mounted on said breathing filter, said breathing filter protecting member allowing ventilation and being configured and arranged with openings small enough to prevent insects from passing therethrough, said openings being in the range of approximately 0.1 mm and 1 mm; and means for fixing said breathing filter unit to an inner surface of said cover so that said breathing filter protecting member is in contact with the inner surface of said cover and said breathing filter unit covers said breathing hole.

9. The disk drive according to claim 8, wherein said breathing filter protecting member comprises a net, whereby said openings are defined by the mesh of said net.

10. The disk drive according to claim 8, wherein said breathing filter protecting member comprises a plate having a plurality of openings therein.

11. The disk drive according to claim 8, wherein said breathing filter protecting member is sandwiched between said breathing filter and the inner surface of said cover.

12. The disk drive according to claim 8 wherein said breathing filter protection member is configured and arranged with openings small enough to prevent insects from passing therethrough.

13. The disk drive according to claim 12, wherein said openings of said breathing filter protection member have diameters of approximately 0.1 mm.

14. A disk drive comprising:

a housing including a base and a cover fixed to said base, said cover having a breathing hole;

at least one disk rotatably mounted in said housing, said at least one disk having a plurality of tracks;

a head for reading/writing data on said at least one disk;

an actuator for moving said head across said tracks of said at least one disk;

a breathing filter fixed to a surface of said cover so as to overlap said breathing hole;

a plurality of double-sided adhesive tapes bonded on one side thereof to said cover and spacedly arranged around said breathing hole; and a solid plate bonded to the other side of said double-sided adhesive tapes.

15. The disk drive according to claim 14, wherein both the space between said solid plate and said cover and the spaces between said spacedly arranged double-sided adhesive tapes are all configured and arranged to be small enough to prevent insects from passing therethrough.

16. The disk drive according to claim 14, wherein said double-sided adhesive tapes are each generally circular shaped.

17. The disk drive according to claim 14, wherein said breathing filter is affixed to an inner surface of said cover and said solid plate is affixed to an outer surface of said cover.

18. A disk drive comprising:

a housing including a base and a cover fixed to said base, said cover having a breathing hole;

at least one disk rotatably mounted within said housing, said at least one disk having a plurality of tracks;

a head for reading/writing data on said at least one disk;

an actuator for moving said head across said tracks of said at least one disk;

a breathing filter unit including a breathing filter and a breathing filter protecting member mounted on said breathing filter, said breathing filter protecting member allowing ventilation and being configured and arranged with openings small enough to prevent insects from passing therethrough, said openings being in the range of approximately 0.1 mm to 1 mm; and means for fixing said breathing filter unit to an outer surface of said cover so that said breathing filter is in contact with the outer surface of said cover and said breathing filter unit covers said breathing hole.

* * * * *

UNITED STATES PATENT AND TRADEMARK OFFICE
CERTIFICATE OF CORRECTION

PATENT NO. : 6,144,522  
DATED : November 7, 2000  
INVENTOR(S) : Myakan et al.

Page 1 of 1

It is certified that error appears in the above-identified patent and that said Letters Patent is hereby corrected as shown below:

<u>Title page,</u>  
Item [56], References Cited, delete "4,888,656" and insert -- 4,888,655 -- therefor.

Signed and Sealed this

Nineteenth Day of February, 2002

*Attest:*

*Attesting Officer*

JAMES E. ROGAN  
*Director of the United States Patent and Trademark Office*